No. 735,570. PATENTED AUG. 4, 1903.
C. C. NEWTON.
BORING OR MILLING MACHINE.
APPLICATION FILED OCT. 19, 1901.
NO MODEL. 4 SHEETS—SHEET 4.
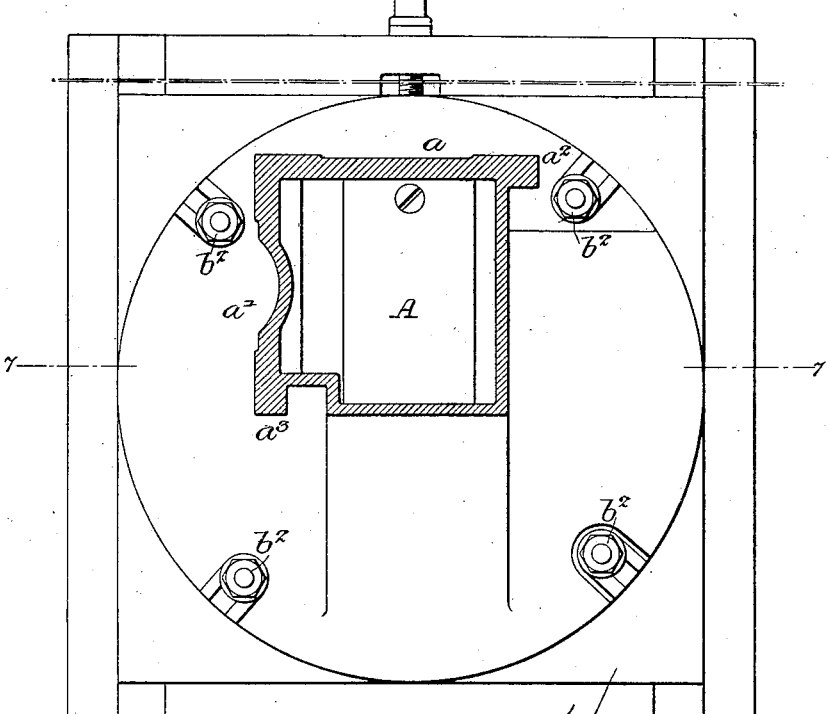
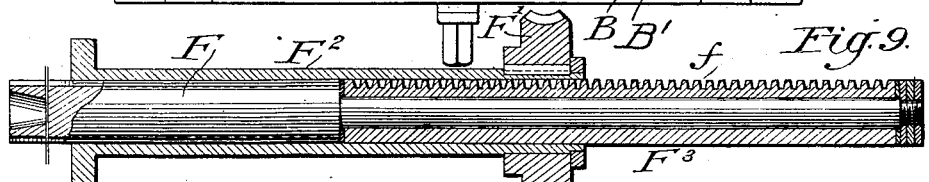
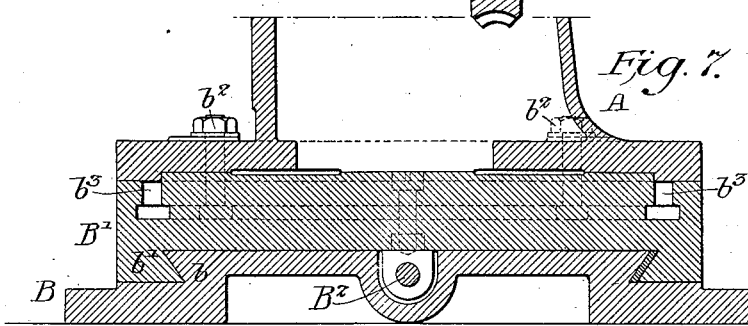
Witnesses:—
Frank L. A. Graham
Herman E. McKins
Inventor:—
Charles C. Newton,
by his Attorneys No. 735,570. Patented August 4, 1903.

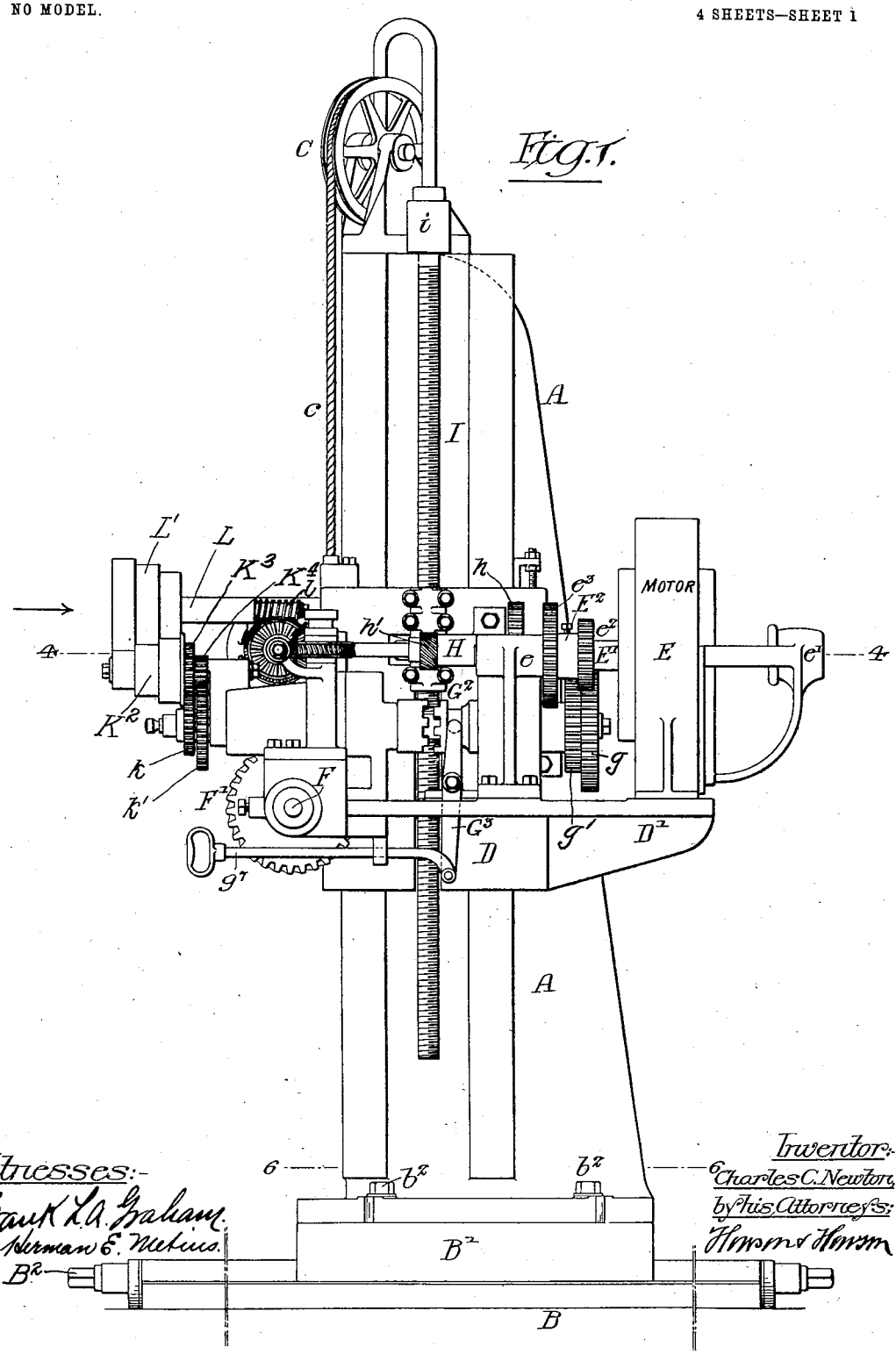

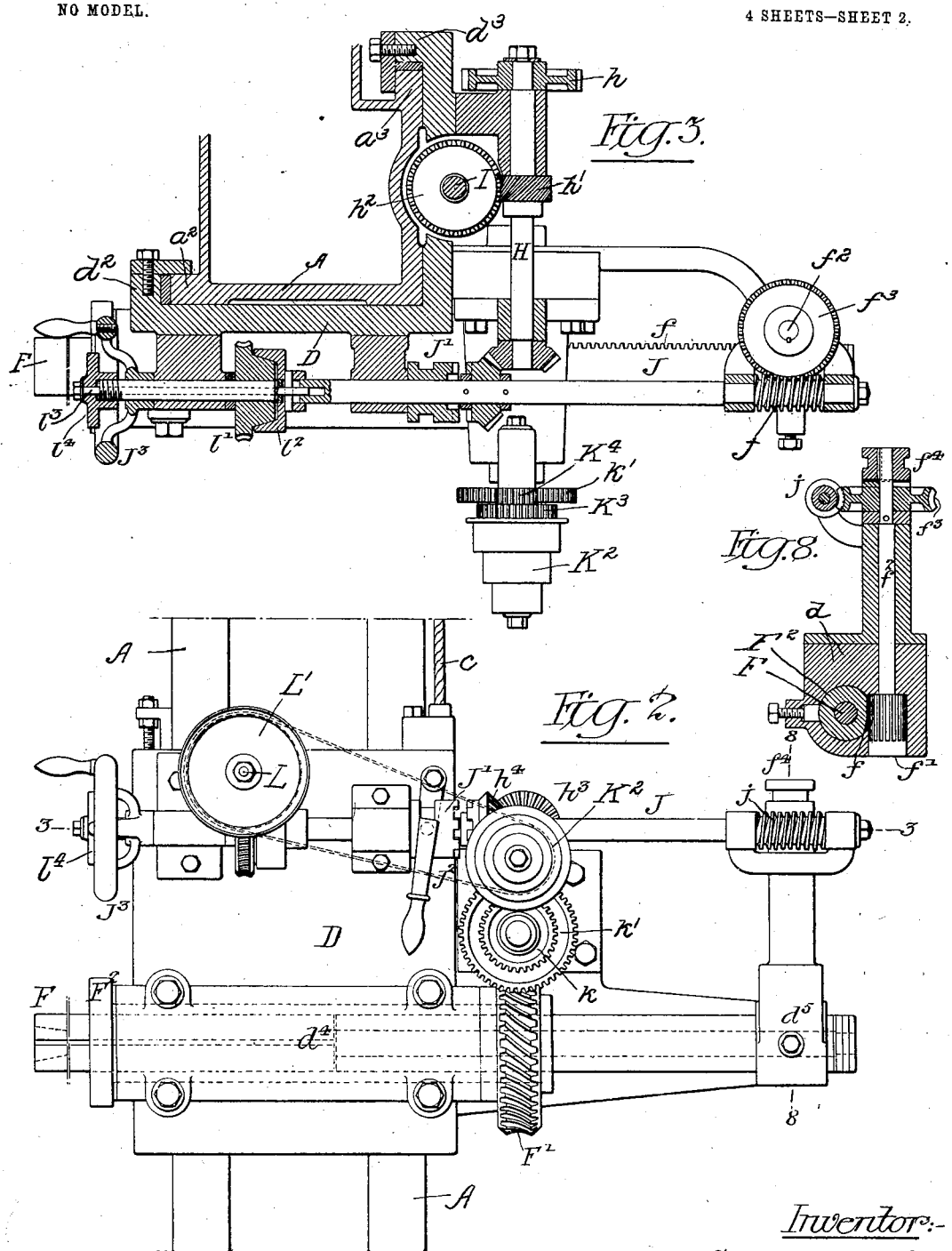

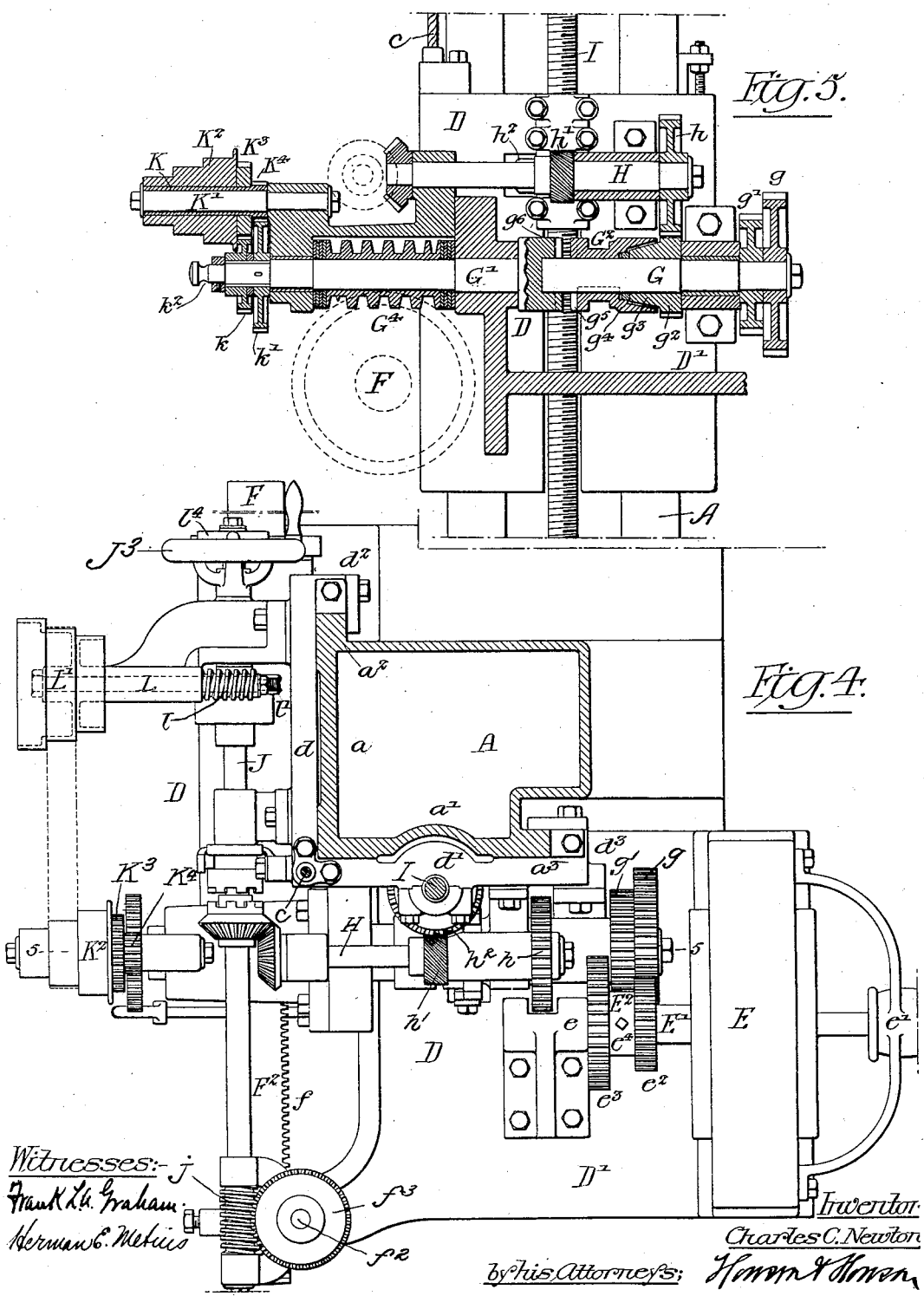

UNITED STATES PATENT OFFICE.

CHARLES C. NEWTON, OF PHILADELPHIA, PENNSYLVANIA, ASSIGNOR TO NEWTON MACHINE TOOL WORKS, INCORPORATED, OF PHILADELPHIA, PENNSYLVANIA, A CORPORATION OF PENNSYLVANIA.

BORING OR MILLING MACHINE.

SPECIFICATION forming part of Letters Patent No. 735,570, dated August 4, 1903.

Application filed October 19, 1901. Serial No. 79,243. (No model.)

*To all whom it may concern:*

Be it known that I, CHARLES C. NEWTON, a citizen of the United States, residing in Philadelphia, Pennsylvania, have invented certain Improvements in Boring or Milling Machines, of which the following is a specification.

My invention relates to certain improvements in boring, drilling, or milling machines which are mounted on vertical standards arranged to be moved from one portion of a shop to another.

The object of my invention is to so construct such a machine that the carriage on which the operating mechanism is mounted will have a substantial bearing upon the standard, and a further object of the invention is to so construct the machine that it can be used for boring, drilling, or milling, as desired.

Referring to the accompanying drawings, Figure 1 is a view in elevation of my improved boring, drilling, and milling machine. Fig. 2 is a side view of a portion of the machine looking in the direction of the arrow, Fig. 1. Fig. 3 is a sectional plan view on the line 3 3, Fig. 2. Fig. 4 is a sectional plan view on the line 4 4, Fig. 1. Fig. 5 is a sectional elevation on the line 5 5, Fig. 4. Fig. 6 is a sectional plan view on the line 6 6, Fig. 1. Fig. 7 is a sectional view on the line 7 7, Fig. 6. Fig. 8 is a section on the line 8 8, Fig. 2, and Fig. 9 is a view of the boring-bar detached.

Heretofore in machines of the type mentioned above the bearing-surface for the carriage or slide has been limited and the weight has not been properly balanced. Consequently unnecessary wear on the parts resulted.

By my invention I am enabled to construct a machine in which the carriage has an extended bearing-surface and in which the spindle and direct driving mechanism therefor are balanced to a certain extent by the motor mechanism and its driving-gearing.

The standard A is mounted on a slide B', which can be traversed on a bed B of any length desired. The slide B' has undercut flanges $b'$, fitting undercut ways $b$ on the bed B, and can be moved on the bed by an adjusting-screw $B^2$. The lower portion of the standard A is circular, and bolts $b^2$ extend through radial slots therein and into a circular slot $b^3$ in the slide B', so that the standard can be turned to any position on the slide.

The standard A has two vertical bearing-faces $a\ a'$, one at right angles to the other, and on the outer edge of the bearing-face $a$ is a flange $a^2$, while on the outer edge of the bearing-face $a'$ is a flange $a^3$.

D is a carriage. The frame of this carriage has two bearing-faces $d\ d'$, one at right angles to the other and arranged to fit the bearing-faces $a\ a'$ of the standard A.

In order to hold the carriage rigidly to the bearing-faces of the standard, I provide lips $d^2\ d^3$, which are arranged to lap over the flanges $a^2\ a^3$, respectively. These lips are preferably adjustable, so as to take up for any wear and make a neat sliding fit between the carriage and the standard. By this construction I am enabled to obtain an increased bearing-surface for the carriage, and this is essential on this type of machine in order to properly support the mechanism which will be described hereinafter.

The carriage and the mechanism carried thereby are counterbalanced by a weight traveling within the standard A and attached to a rope or cord $c$, which passes around a head-wheel C, mounted in suitable bearings on the standard A, the opposite end of this rope being attached to the upper end of the carriage D at the point where the bearing-faces $d\ d'$ join, as clearly shown in Figs. 1 and 4.

The machine shown in the drawings is of that type in which the bar is driven by an electric or other suitable motor mounted on the carriage.

The motor E in the present instance is the ordinary type of electric motor mounted on a bracket D', forming part of the carriage D. F is the boring, drilling, or milling bar, which is mounted in suitable bearings $d^4\ d^5$ on the carriage D, and motion is imparted to this bar through gearing which will be described hereinafter.

The boring-bar F is mounted at right angles to the shaft of the motor E and the mechanism is so designed that the weight will be distributed on the two sides of the frame, so that one will act to counterbalance the other to a certain degree.

The shaft E' of the motor E is mounted in bearings $e$ $e'$, and on the motor-shaft is a sleeve $E^2$, carrying gear-wheels $e^2$ $e^3$ of different diameters. This sleeve can be adjusted longitudinally on the shaft E' and held in the adjusted position by a set-screw $e^4$.

On the shaft G, mounted in a bearing on the carriage D, are two gear-wheels $g$ $g'$. The gear-wheel $g$ is arranged to mesh with the gear-wheel $e^2$ on the shaft E' and the gear-wheel $g'$ is arranged to mesh with the gear-wheel $e^3$ when the said gearing is adjusted in line, so that the speed of the shaft G can be varied by simply shifting the sleeve $E^2$.

The shaft G extends into the enlarged end of a worm-shaft G', which is also mounted in the slide D. Loose on the shaft G is a pinion $g^2$, having a cone-shaped hub $g^3$, forming part of the friction-clutch, and splined to the shaft G is a clutch-sleeve $G^2$, having a friction-clutch face $g^4$, arranged to be thrown into contact with the tapered hub $g^3$ of the wheel $g^2$. On the opposite end of this clutch-sleeve $G^2$ are teeth $g^5$ of a positive clutch. These teeth can be thrown into gear on the longitudinal movement of the sleeve with teeth $g^6$ on the enlarged end of the worm-shaft G'. The clutch-sleeve $G^2$ is operated by a lever $G^3$, which can be moved by a shifting-bar $g^7$, Fig. 1.

Meshing with the pinion $g^2$ is a gear-wheel $h$ on a shaft H, mounted directly above the shaft G. On this shaft H is a spiral gear $h'$, which meshes with a spiral gear-wheel $h^2$, confined longitudinally in the frame of the carriage D and having a nut engaging the threads of the vertical screw I, hung from a bearing $i$ at the upper end of the standard A, so that when the shaft H is turned the nut will turn on the screw and the carriage will be raised or lowered. The movement of the carriage can be stopped immediately by shifting the clutch-sleeve $G^2$ to midposition.

The bar F has a worm-wheel F' mounted thereon, and this worm-wheel meshes with a worm $G^4$ on the worm-shaft G', so that when the clutch-sleeve $G^2$ is thrown into gear with the worm-shaft G' the bar will be turned through the shafts G G', worm, and worm-wheel.

The boring-bar is made in two parts, as shown clearly in Figs. 2 and 9, the boring-bar proper, F, and the sleeve $F^2$, on which the worm-wheel F' is mounted, and this sleeve $F^2$ has keys or splines which enter keyways in the bar proper, F. The portion $F^2$ of the bar is also a sleeve mounted on the reduced end of the bar proper, F, and confined longitudinally thereon, but so arranged that the bar can turn therein. On this portion F is a rack $f$, which meshes with a pinion $f'$ on the vertical shaft $f^2$, on which is loosely mounted a worm-wheel $f^3$, which can be thrown into and out of gear with the said shaft by a clutch $f^4$, Fig. 8. The worm-wheel $f^3$ meshes with a worm $j$ on the shaft J, mounted in bearings on the carriage D. This shaft is driven from the worm-shaft G' by the mechanism which I will now describe.

The end of the worm-shaft G' is reduced in diameter, and mounted on this reduced portion are two gear-wheels $k$ $k'$. $k^2$ is an adjustable key which can be shifted longitudinally in the keyways of the gear-wheels, so that either one or the other of the said gear-wheels can be keyed to the shaft G'. This form of clutch is common in this type of machine.

Meshing with the wheels $k$ $k'$ are two wheels $K^3$ $K^4$ of different diameters. These wheels are mounted on a sleeve K, carried by a stud K', projecting from the frame of the machine, and on the sleeve K is a three-step pulley $K^2$.

On the bracket carried by the carriage D is a shaft L, having a three-step pulley L', which is belted to the pulley $K^2$, and on the opposite end of this shaft L is a worm $l$, which meshes with a worm-wheel $l'$ on the shaft J. This worm-wheel is loose on the said shaft J and its hub is tapered to form one face of a friction-clutch. The other face of said clutch is formed on a sleeve $l^2$, keyed to the shaft and moved longitudinally thereon by an internal shifting-rod $l^3$, actuated by a handled nut $l^4$ at one end of the shaft J. A pin secures the said shifting-rod to the sleeve and passes through slots in the shaft. This form of clutch is common. Thus it will be seen that when the clutch is thrown into gear the shaft J can be rotated through the worm-shaft G' and the train of gears and belting described above, and when the clutch $f^4$ is thrown into gear the bar F will not only be rotated by the worm and worm-wheel, but will also be fed forward by the rack and pinion.

When the tool is used as a milling-tool, then the mechanism for feeding the bar forward is thrown out of gear.

The clutch $G^2$, which is actuated either to drive the screw to raise and lower the carriage or to drive the worm-shaft G', is so arranged that the carriage cannot be raised and lowered when the worm is rotated without operating special mechanism, the object being to prevent the movement of the carriage while the machine is used as a drilling or boring machine. When it is wished to use the machine as a milling-machine, then the bar is rotated by the mechanism described and the carriage is raised and lowered not through the gearing $g^2$ and $h$, but from the shaft J through the gearing which I will now describe.

On the end of the shaft H is a bevel-gear $h^3$, meshing with the bevel-wheel $h^4$, loose on the shaft J. Splined to the shaft is a clutch-sleeve J', actuated by a lever $J^2$. This clutch-sleeve has teeth which engage teeth on the hub of the bevel gear-wheel $h^4$, so that when the clutch is thrown into gear the shaft H is driven from the shaft J, and as this shaft is geared to the nut on the screw I vertical motion will be imparted to the carriage when the bar F is turned for use during the milling operation.

It will be seen that the location of the shafts and the gearing is such that the shafts and gearing on one side counterbalance, to a certain extent, the shafts and gearing on the other side of the carriage, so that the carriage is not subjected to such a strain as when the mechanism is mounted all on one side, as is commonly the practice on this type of machine. Furthermore, by making an angle-frame, as shown, the carriage has an extended bearing-surface, and consequently it can be operated more readily and will not be subjected to as great a wear as the ordinary carriage.

The operation of the machine is as follows: When the machine is used as a boring or drilling machine, then the clutch $G^2$ is thrown over in contact with the hub of the gear-wheel $g^2$, so as to raise or lower the boring-bar to the position desired, after which the clutch is thrown out of engagement with the hub of the gear-wheel $g^2$ and into engagement with the worm-shaft $G'$, and the shaft J is also rotated from the shaft $G'$ through the gearing and belting, and the vertical shaft $f^2$ is thrown into gear with the said shaft J, so as to move the boring-bar longitudinally.

When the machine is used as a milling-machine, the clutch $G^2$ is thrown into engagement with the worm-shaft $G'$, so as to rotate the bar, and the nut on the vertical screw I is driven by means of the gearing and the shaft J and clutch $J'$ from the worm-shaft $G'$. The longitudinal feed mechanism for the spindle is thrown out of gear by shifting the clutch $f^4$.

The shaft J can be turned by hand when desired, as it is provided with a hand-wheel $J^3$.

I claim as my invention—

1. The combination of a vertical standard of a metal-working machine having two vertical guideways, one at an angle to the other, a carriage having two bearing-faces, one resting in contact with one guideway and the other with the other guideway, and bearings for the mechanism of the said machine mounted on both faces of the carriage, substantially as described.

2. The combination of a standard having two guideways one at an angle to the other, a carriage, a tool-spindle and driving mechanism therefor mounted on the carriage, said carriage being formed with portions placed to coöperate with the guideways of the standard, said driving mechanism being supported in two parts, one on each of said portions of the carriage and in positions such that one part acts to balance the other, substantially as described.

3. The combination of a vertical standard having two vertical guideways at right angles to each other, a right-angled carriage arranged to travel on both guideways, a bearing for the tool-spindle, and driving mechanism mounted on both faces of the carriage, substantially as described.

4. The combination in a portable boring and milling machine, of a standard, a carriage thereon, a motor, a motor-shaft, a driven shaft and a worm-shaft, clutch mechanism between the two, a boring bar or spindle having a worm-wheel mounted thereon and meshing with the said worm, a shaft parallel with the motor-shaft, a nut on the feed-screw, means for driving the nut from the said shaft, a horizontal shaft parallel with the boring bar or spindle, and a vertical feed-shaft driven by said horizontal shaft for feeding the boring-bar in and out, substantially as described.

5. The combination in a portable boring and milling machine, of a standard, a carriage thereon, a motor, a motor-shaft, a driven shaft and a worm-shaft, clutch mechanism between the two, a boring bar or spindle having a worm-wheel mounted thereon and meshing with the said worm, a shaft parallel with the motor-shaft, a nut on the feed-screw, means for driving the nut from the said shaft, a horizontal shaft parallel with the boring bar or spindle, a vertical feed-shaft driven by said horizontal shaft for feeding the boring-bar in and out, gearing and clutch mechanism whereby the shaft for raising and lowering the carriage is driven from the horizontal shaft, substantially as described.

6. The combination in a combined boring, drilling and milling machine, of a standard having two vertical guideways one at an angle to the other, a carriage having bearing-faces arranged to rest on said guideways, a bracket on one side of the said carriage, a motor mounted on the bracket, a shaft geared to the motor-shaft, a clutch on said shaft, a pinion loose on said shaft, a feed-screw on the standard, a nut on the feed-screw driven by the said pinion, a worm-shaft in line with the shaft driven from the motor, said shaft and pinion having clutch-faces with which the clutch-sleeve can engage, a boring-bar made in two parts, one a sleeve and the other a spindle splined to the sleeve, a worm-wheel on the sleeve meshing with the worm on the worm-shaft, a rack-sleeve on the spindle portion of the bar, a pinion meshing with the rack, a shaft geared to the worm-shaft, and a clutch between the said driven shaft and the pinion which engages the rack so that the said pinion can be thrown out of gear with the driven shaft when the machine is used as a milling-machine, substantially as described.

7. The combination in a combined boring, drilling and milling machine, of a standard having two vertical guideways one at an angle to the other, a carriage having bearing-faces arranged to rest on said guideways, a bracket on one side of the said carriage, a motor mounted on the bracket, a shaft geared to the motor-shaft, a clutch on said shaft, a pinion loose on said shaft, a feed-screw on the standard, a nut on the feed-screw driven by the said pinion, a worm-shaft in line with the shaft driven from the motor, said shaft and pinion having clutch-faces with which the clutch-sleeve can engage, a boring-bar made in two parts, one a sleeve and the other a spindle splined to the sleeve, a worm-wheel on the sleeve meshing with the worm on the worm-shaft, a rack-sleeve on the spindle portion of the bar, a pinion meshing with the rack, a shaft geared to the worm-shaft, a clutch between the said driven shaft and the pinion which engages the rack so that the said pinion can be thrown out of gear, gearing between the shaft geared to the nut on the vertical screw and clutch mechanism between said gearing and the driven shaft, so that, when desired, the nut can be turned on the screw through the medium of the worm-shaft and the driven shaft geared thereto, substantially as described.

In testimony whereof I have signed my name to this specification in the presence of two subscribing witnesses.

CHARLES C. NEWTON.

Witnesses:
 WILL. A. BARR,
 JOS. H. KLEIN.